United States Patent
Pepper et al.

(10) Patent No.: US 12,370,497 B2
(45) Date of Patent: Jul. 29, 2025

(54) FILTRATION SYSTEM FOR CELL REMOVAL SYSTEMS AND METHODS OF USING THE SAME

(71) Applicant: EMD Millipore Corporation, Burlington, MA (US)

(72) Inventors: Clinton Boyd Pepper, Bend, OR (US); David Andrew Hansen, Bend, OR (US)

(73) Assignee: EMD Millipore Corporation, Burlington, MA (US)

( * ) Notice: Subject to any disclaimer, the term of this patent is extended or adjusted under 35 U.S.C. 154(b) by 460 days.

(21) Appl. No.: 17/795,006

(22) PCT Filed: Feb. 18, 2021

(86) PCT No.: PCT/IB2021/051402
§ 371 (c)(1),
(2) Date: Jul. 25, 2022

(87) PCT Pub. No.: WO2021/165885
PCT Pub. Date: Aug. 26, 2021

(65) Prior Publication Data
US 2023/0056473 A1    Feb. 23, 2023

Related U.S. Application Data

(60) Provisional application No. 62/978,770, filed on Feb. 19, 2020.

(51) Int. Cl.
B01D 63/04    (2006.01)

(52) U.S. Cl.
CPC ...... B01D 63/046 (2013.01); *B01D 2313/243* (2013.01); *B01D 2313/58* (2013.01); *B01D 2313/902* (2022.08)

(58) Field of Classification Search
None
See application file for complete search history.

(56) References Cited

U.S. PATENT DOCUMENTS

| 5,015,585 A | 5/1991 | Robinson |
| 6,582,955 B2 | 6/2003 | Martinez et al. |
(Continued)

FOREIGN PATENT DOCUMENTS

| CN | 102639167 A | | 8/2012 |
| CN | 105592913 A | | 5/2016 |
| JP | 2004329033 A | * | 11/2004 |
| WO | 03/036267 A2 | | 5/2003 |
| WO | 2021/165885 A1 | | 8/2021 |
(Continued)

OTHER PUBLICATIONS

Office Action received for Chinese Patent Application No. 202180013273.8 mailing date Mar. 21, 2024, 14 Pages (7 Pages of English Translation & 7 Pages of Official Copy).
(Continued)

*Primary Examiner* — Bradley R Spies
*Assistant Examiner* — Jeannie McDermott
(74) *Attorney, Agent, or Firm* — EMD Millipore Corporation

(57) ABSTRACT

A filtration system can include a loading member configured to receive a plurality of filtration members which can be sequentially moved from a non-active position in which a respective one of the plurality of filtration members is not in fluid communication with a sample flow path of the cell removal system, to an active position in which the respective filtration member is in fluid communication with the sample flow path, and to a discarded position in which the respective filtration member has been removed from fluid communication with the sample flow path.

18 Claims, 19 Drawing Sheets

(56) References Cited

U.S. PATENT DOCUMENTS

| | | | |
|---|---|---|---|
| 6,616,912 | B2 | 9/2003 | Eddleman et al. |
| 7,172,696 | B1 | 2/2007 | Martinez et al. |
| 2002/0168758 | A1 | 11/2002 | Martinez et al. |
| 2010/0255560 | A1* | 10/2010 | Call .................. G01N 15/0255 435/243 |
| 2021/0317394 | A1* | 10/2021 | Iwakami ................ C12M 23/14 |

OTHER PUBLICATIONS

International Preliminary Report on Patentability received for PCT Application No. PCT/IB2021/051402 mailing date Sep. 1, 2022, 7 Pages.

Office Action received for Canadian Patent Application No. 3,171,869 mailing date Aug. 8, 2024, 5 Pages.

International Search Report and Written Opinion received for PCT Application No. PCT/IB2021/051402, mailed on May 10, 2021, 8 Pages.

Office Action received for Japanese Patent Application No. 2022-549637 mailing date Oct. 3, 2023, 9 Pages (5 Pages of English translation & 4 Pages of official copy).

Communication pursuant to Article 94(3) EPC received for European Patent Application No. 21708385.6 mailing date Oct. 10, 2023, 3 Pages.

Office Action received for Canadian Patent Application No. 3,171,869 mailing date Nov. 6, 2023, 4 Pages.

Office Action received for Korean Patent Application No. 10-2022-7028160 mailing date Jun. 10, 2024, 13 Pages (6 Pages of English Translation and 7 Pages of Official Copy).

* cited by examiner

FILTRATION SYSTEM FOR CELL REMOVAL SYSTEMS AND METHODS OF USING THE SAME

RELATED APPLICATIONS

This application is a U.S. National Stage application of International Application No. PCT/IB2021/051402, filed Feb. 18, 2021, which claims the benefit of priority to U.S. Provisional Application 62/978,770, dated Feb. 19, 2020, each of which is incorporated by reference in its entirety.

FIELD

This disclosure relates to equipment and processes for filtration of materials, including the filtration of high solids content cell-containing solutions to produce cell-free solutions and/or samples for further analysis.

BACKGROUND

Filtration systems that separate solid matter and fluid from a mixture with a filter medium are used in various industries.

For example, filtration of cell solutions generated with bioreactors can be desirable to attain cell-free samples for further laboratory testing and analysis, and to obtain on-line process control and feedback to conditions within the bioreactor so that adjustments can be made. Examples of such bioreactors are described in U.S. Pat. Nos. 5,015,585A, 6,582,955B2, 6,616,912B2, and examples of filtration systems that may be implemented are described in U.S. Pat. No. 7,172,696B1.

Such systems however have a number of disadvantages, such as long set-up and turnaround times between batches, low scale-up opportunities, quality control issues, and difficulties in operating in an automatic/continuous manner. Thus, there is a need for systems and methods that overcome the some or all of the deficiencies in the prior art.

SUMMARY

Various embodiments are disclosed herein of filtration systems and methods of using the same in connection with cell removal systems.

In one embodiment, a method of filtering a cell-containing solution is provided. The method comprises coupling a first filtration member with a first filtration flow path in fluid connection with a sample flow path of a cell removal system, delivering a sample of the cell-containing solution into the sample flow path and into the first filtration flow path, delivering a sample of the cell-containing solution into the sample flow path and into the first filtration flow path, separating cellular matter from the sample of the cell-containing solution with the first filtration member to obtain a permeate, moving the first filtration member out of fluid connection with the sample flow path, coupling a cleaning shell with a connecting flow path in fluid connection with the sample flow path of the cell removal system, delivering a sanitizing fluid through the sample flow path and the connecting flow path of the cleaning shell, moving the cleaning shell out of fluid connection with the sample flow path, and coupling a second filtration member with a second filtration flow path in fluid connection with the sample flow path of the cell removal system.

In another embodiment, a filtration system for use with a cell removal system is provided. The system comprises a loading member configured to receive a plurality of filtration members, each of the plurality of filtration members including filtration inlet, a filtration outlet, and a filtration flow path that extends from the filtration inlet to the filtration outlet. The system also comprises at least one actuator configured to move the plurality of filtration members, sequentially, from a non-active position in which a respective one of the plurality of filtration members is not in fluid communication with a sample flow path of the cell removal system, to an active position in which the respective filtration member is in fluid communication with the sample flow path, and to a discarded position in which the respective filtration member has been removed from fluid communication with the sample flow path.

In yet another embodiment, a cell removal system is provided. The system comprises a sample flow path having a sample inlet for receiving a sample of a cell-containing solution, a loading member configured to receive a plurality of filtration members, and at least one actuator configured to move the plurality of filtration members, sequentially, from a non-active position in which a respective one of the plurality of filtration members is not in fluid communication with a sample flow path of the cell removal system, to an active position in which the respective filtration member is in fluid communication with the sample flow path, and to a discarded position in which the respective filtration member has been removed from fluid communication with the sample flow path.

The foregoing and other objects, features, and advantages of the invention will become more apparent from the following detailed description, which proceeds with reference to the accompanying figures.

DETAILED DESCRIPTION

General Considerations

Figure 1:
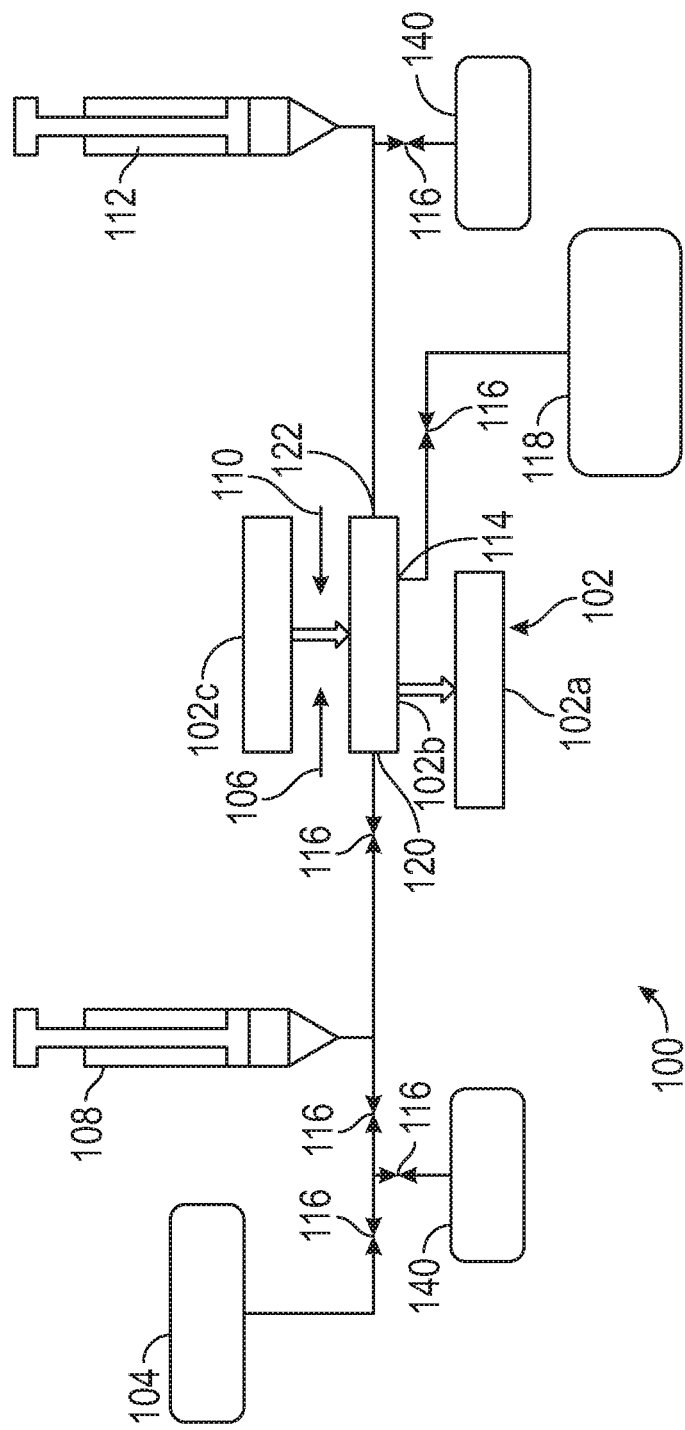
FIG. 1 illustrates an exemplary filtration system that can be used with an exemplary cell removal system.

The present disclosure relates to equipment and processes for filtering materials, such as cell-containing solutions to provide cell-free solutions. It should be understood that although the various embodiments described herein disclose particular methods or materials applied in specific implementations, in view of these teachings other methods, materials, and implementations that are similar or equivalent to those described herein may be possible. As such, the following description is exemplary in nature and is not intended to limit the scope, applicability, or configuration of the disclosure in any way. Various changes to the described embodiments may be made, such as in the function and arrangement of the elements described herein, without departing from the scope of the disclosure.

As used in this application the singular forms "a," "an," and "the" include the plural forms unless the context clearly dictates otherwise. Additionally, the term "includes" means "comprises." Furthermore, as used herein, the term "and/or" means any one item or combination of items in the phrase. In addition, the term "exemplary" means serving as a non-limiting example, instance, or illustration. As used herein, the terms "e.g.," and "for example," introduce a list of one or more non-limiting embodiments, examples, instances, and/or illustrations.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited. Indeed, the dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm" (i.e., every value in a practical range close to 40 mm).

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "provide," "produce," "determine," and "select" to describe the disclosed methods. These terms are high-level descriptions of the actual operations that are performed. The actual operations that correspond to these terms will vary depending on the particular implementation and are readily discernible by one of ordinary skill in the art having the benefit of this disclosure.

As noted above, the systems and methods described herein, and individual components thereof, should not be construed as being limited to the particular uses or systems described herein in any way. Instead, this disclosure is directed toward all novel and non-obvious features and aspects of the various disclosed embodiments, alone and in various combinations and subcombinations with one another. For example, any features or aspects of the disclosed embodiments can be used in various combinations and subcombinations with one another, as will be recognized by an ordinarily skilled artisan in the relevant field(s) in view of the information disclosed herein. In addition, the disclosed systems, methods, and components thereof are not limited to any specific aspect or feature or combinations thereof, nor do the disclosed things and methods require that any one or more specific advantages be present or problems be solved.

As used herein, the term "wetting component" means a component that comes in direct contact with a fluid (gas and/or liquid) and are typically selected from the group consisting of reservoirs, conduits, filters, and combinations thereof.

As used herein, the term "fluidly coupled" or "fluid communication" refers to two or more components that have a structural connection between them that permits the transfer of fluid from one part to another via a fluid coupling. The terms "fluidly coupled" or "fluid communication" do not require a fluid transfer to be occurring, only that a fluid pathway has been established such that fluid may flow when the device is being used to cause such a fluid transfer.

As used herein, the term "filtration member" refers to a filter that is suitable for separating high solids content cell-containing solutions from cell-free solutions, such as a hollow fiber filter member. As used herein, a "hollow fiber module" is a filtration member that contains a plurality of hollow fibers.

As used herein, the term "uses or use" means the procedure of filtering a same solution (e.g. formulation equivalent solution) before changing to another different solution (e.g. a formulation distinct solution).

As used herein, the term "single use" means that an element referred to as "single use" may be disposed with after a single use.

As used herein, the term "cell-containing" refers to a solution or sample, or portion thereof, that contains cellular matter. The term "cell-free" refers to a solution or sample, or portion thereof that has been filtered to reduce or eliminate cellular matter from a cell-containing solution or sample.

As used herein, the term "permeate" refers to materials that are separated from a cell-containing solution or sample by the filtration member, such as a cell-free solution or sample.

As used herein, the term "bioreactor" refers to any manufactured or engineered device or system that supports a biologically active environment, such as a device or system in which cells or tissues can be grown, for example, in a rigid reusable container (e.g., stainless steel) or a single-use container (e.g., a flexible bag).

Filtration Members and Methods of Use

This disclosure relates to equipment and processes for the filtration of high solids content cell-containing solutions to produce cell-free solutions and/or samples for further analysis. Such equipment and processes can be used with, for example, bioreactor sampling systems. In particular, product quality attribute testing of a sample from a bioreactor can desirably include analyzing one or more cell-free samples. To provide cell-free samples, a cell removal system (CRS) can separate the cells from permeate to be conveyed to instruments such as high-performance liquid chromatography (HPLC), ultra-performance liquid chromatography (UPLC), mass spectrometers, and other devices for analysis.

FIG. 1 illustrates a cell removal system 100 that uses tangential flow filtration in combination with a filtration system 102, such as a hollow fiber module, to separate cells from permeate. As shown in FIG. 1, filtration system 102 can comprise a plurality of filtration members 102a, 102b, 102c that can be received in the cell removal system 100 for filtration.

The filtration members can be fluidly coupled to a sample flow path of the cell removal system 100 by loading the filtration member in the cell removal system 100 and coupling the filtration member at both ends such that a filtration flow path of the filtration member forms part of a flow path of the cell removal system (i.e., the filtration member is in fluid communication with the cell removal system). In addition, filtration members can be fluidly coupled to additional devices, such as the coupling of the filtration system sample outlet 114 to a reservoir or liquid handling system 118 for further processing of the permeate separated from the cells.

FIG. 1 illustrates the sample flow path (and other flow paths) schematically. It should be understood that these flow paths can be formed of any conduit, tubing, or internal passages that are suitable for the providing the fluid pathways that allow the flow of material within and/or outside of the cell removal system as shown.

The coupling of the filtration member to the cell removal system can be automated, such as by one or more actuators that move to engage the cell removal system with the respective ends of the filtration members and/or filtration system sample outlet. Alternatively, the coupling of such components can be manually achieved.

In the embodiment shown in FIG. 1, filtration member 102a has been used in a tangential flow filtration operation and removed from service (e.g., discarded), filtration member 102b is currently configured for use in a tangential flow filtration operation (e.g., the active filtration member), and filtration member 102c is available for deployment and use after filtration member 102b is removed from service. In some embodiments, the exchange of one filtration member for another can occur after a single use of the active filtration member.

As shown in FIG. 1, in one embodiment, a sample of a cell-containing solution can be drawn from a sample source 104. The sample can be provided using any device suitable for taking one or more samples from a bioreactor in a generally aseptic manner.

The sample can be caused to flow to and through the filtration system 102 in a first direction 106 by a first pump member 108. After moving through the filtration system 102, the sample can be redirected in a second direction 110, opposite the first, back through the filtration system 102 by a second pump member 112. As the sample is being filtered by the filtration system 102 (i.e., active filtration member 102b in FIG. 1), a cell-free solution (i.e., a cell-free sample) can exit the filtration system through a filtration system sample outlet 114 in the active filtration member.

In the embodiment shown in FIG. 1, the first and second pump members 108, 112 are syringe pumps. However, other pump configurations are possible, as described and shown in other embodiments herein.

As shown in FIG. 1, a plurality of valves 116 can be provided throughout the cell removal system to facilitate sampling and filtration, as well as cleaning portions of the cell removal system. In some embodiments, the filtered cell-free solution that exits outlet 114 can be delivered, when the respective valve 116 is in an open position, to a sample reservoir and/or a liquid handling system 118 for further processing and/or analysis.

Thus, to achieve filtration of the sample, the active filtration member is positioned so that its filtration system inlet 120 and filtration system outlet 122 are in fluid communication with the sample flow path. This permits the sample to be drawn from the sample source 104 and delivered through a filtration flow path of the active filtration member to separate the cells from permeate. The fluid coupling of the cell removal system to the filtration system (i.e., at the filtration system inlet and outlet) can be achieved by any suitable fluid coupling device of the cell removal system, such as those disclosed in more detail below.

Upon removal of the cell-free solution from the sample and/or the completion of the filtration event, the active filtration member (i.e., filtration member 102b in FIG. 1) can be removed and/or discarded so that the filtration system inlet 120 and the filtration system outlet 122 of the filtration member are no longer in fluid communication with the sample flow path of the cell removal system 100.

After removal of the active filtration member (e.g., filtration member 102b), a new filtration member (e.g., filtration member 102c) can be moved so that the filtration system inlet 120 and the filtration system outlet 122 of the new filtration member are in fluid communication with the sample flow path of the cell removal system 100 (e.g., the filtration flow path of the new filtration member is in fluid communication with the sample flow path of the cell removal system.

In some embodiments, after removing and/or discarding a filtration member, the sample flow paths in the cell removal system 100 can be sanitized before a new filtration member is moved into fluid communication with the sample flow path of the cell removal system 100.

In some embodiments, sanitization is provided for all of the wetting components of the cell removal system, so that the components that come into direct contact with the sample (e.g., reservoirs, conduits) can be sanitized. To achieve such sanitization, a fluid coupling member (e.g., a cleaning shell) can establish a connecting flow path across the inlet and outlet portions of the cell removal system that would be connected to the filtration member during a filtration process.

Figure 2:
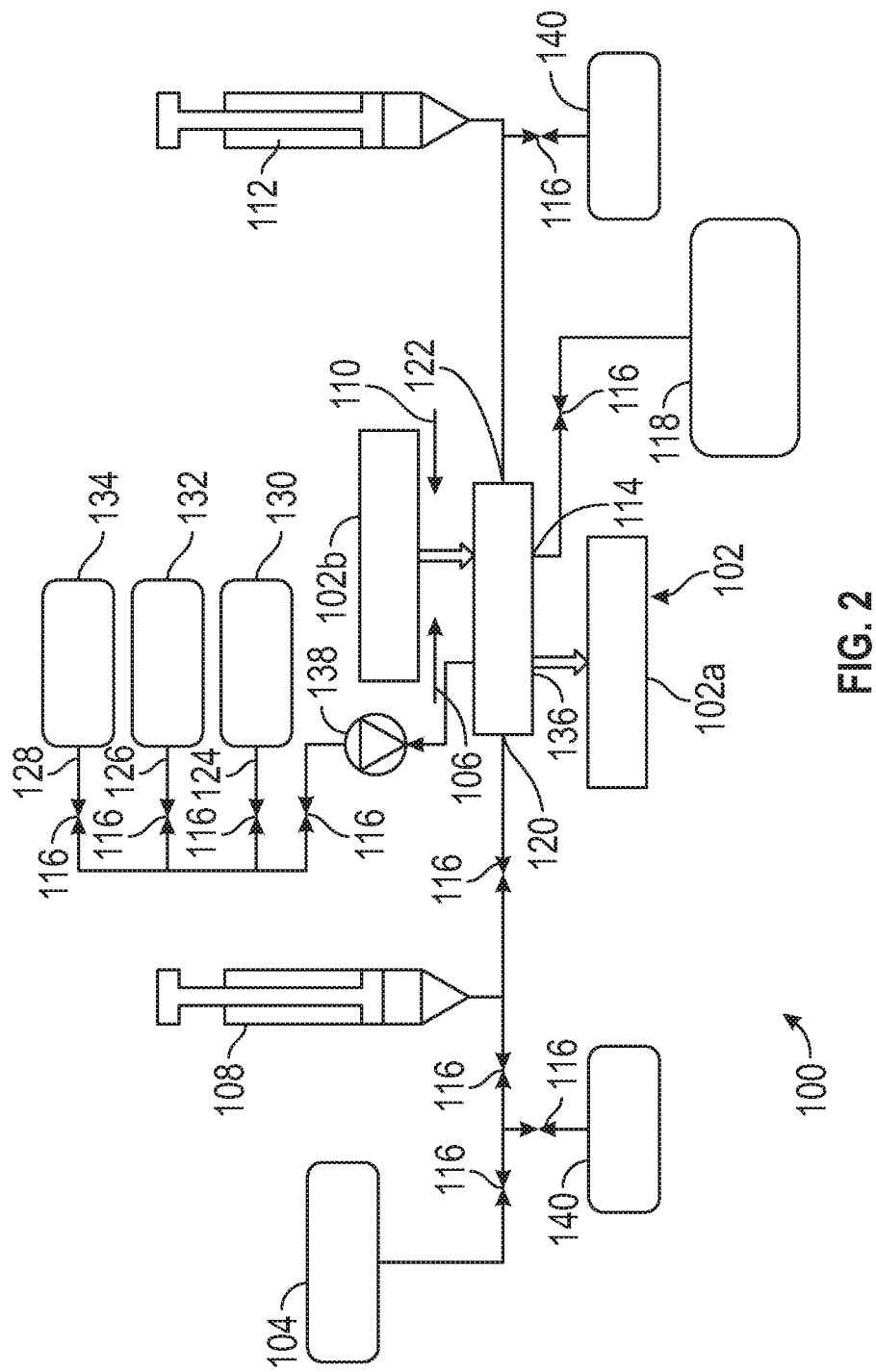
FIG. 2 illustrates another exemplary filtration system that can be used with an exemplary cell removal system.

As shown in FIG. 2, the cell removal system 100 comprises a sanitizing fluid inlet 124, a water inlet 126, and a gas inlet 128, which are coupled, respectively, to a sanitizing fluid source 130, a water source 132, and a gas source 134. Each of these can be arranged to be in fluid communication with at least a portion of the sample flow path of the cell removal system 100. Although this embodiment illustrates a system that uses sanitizing fluid, water, and gas, it should be understood that other systems could use any combination of such fluids (e.g., sanitizing fluid only, sanitizing fluid and gas only, etc.).

The valves 116 associated with the sanitizing fluid inlet 124, the water inlet 126, and the gas inlet 128 can be independently operable between a closed position that restricts flow and an open position that allows flow of the respective materials.

As discussed above, a flow path across the portion of the cell removal system that is provided during filtration, can be provided during sanitization by another fluid coupling member (e.g., a cleaning shell). Cleaning shell 136 has an inlet and outlet that is configured to be positioned in fluid communication with the sample flow path of the cell removal system (in the same or similar manner as that of the filtration member) to allow for sanitization of the upstream portion of the sample flow path (i.e., the inlet side of the filtration member) and the downstream portion of the sample flow path (i.e., the outlet side of the filtration member).

Thus, to sanitize the sample flow path between the use of a first filtration member and a second filtration member, the first filtration member can be removed (e.g., filtration member 102a in FIG. 2) and the cleaning shell 136 can be positioned in the cell removal system 100 in its place.

The valve 116 associated with the sanitizing fluid can be moved to the open position and sanitizing fluid can be delivered into the sample flow path of the cell removal system and the connecting flow path of the cleaning shell. A pump 138 can be provided to facilitate the delivery of the sanitizing fluid from the sanitizing fluid inlet 124 through the sample flow path and connecting flow path.

The sanitizing fluid can be any suitable fluid that can sanitize, disinfect, or sterilize the sample flow path. The sanitizing fluid can be a liquid, a gas, or a combination thereof. Sanitizing fluids include steam, ethylene oxide, glutaraldehyde, formaldehyde, formalin, chlorine gas, hypochlorite, bromine, hypobromite, iodine, hypoiodite, bromine chloride, chlorine dioxide, ozone, hydrogen peroxide, monochloramine, dichloramine, trichloramine, quatinary ammonium salts, ethanol, 70% ethanol/water, isopropanol, 70% isopropanol/water, peroxyacetic acid, and peracetic acid. In one embodiment, the sanitizing fluid is steam. In another embodiment, the sanitizing fluid is ethylene oxide. In another embodiment, the sanitizing fluid is glutaraldehyde.

As shown in FIG. 2, the gas inlet 128 can be provided upstream of the sanitizing fluid inlet 124 to deliver a gas through the sample flow path and connecting flow path. The gas can eliminate and/or reduce the amount of sanitizing fluid remaining within the sample flow path after the sample flow path is exposed to the sanitizing fluid. Thus, the gas can clean the path and/or remove any material from previous samples in the area contacted by the sanitizing fluid. In one embodiment, the gas comprises compressed air.

In some embodiments, water can also be provided to clean the sample flow path, either alone, or in combination with the sanitizing fluid and/or gas. For example, after sanitizing the sample flow path with a sanitizing fluid, water can be introduced into the sample flow path to remove, at least in part, residual sanitizing fluid from the sample flow path.

As shown in FIG. 2, at least some portion of the gas path overlaps with the sanitizing fluid path, which in turn overlaps at least in part with the sample flow path, to permit the gas to purge the sanitizing fluid from the sample path.

As shown in FIG. 2, a pump 138 can be used to facilitate the delivery of one or more of the sanitizing fluid, water, and/or gas associated with the cleaning operation. In some embodiments, the pump 138 can comprise a peristaltic pump.

As shown in FIGS. 1 and 2, one or more valves in the cell removal system can be opened to allow the delivery of materials (e.g., sample, sanitizing fluid, gas, water, etc.) to a waste reservoir 140. For example, as shown in FIG. 2, the valve 116 associated with the downstream waste reservoir 140 can be opened to permit the discharge of sanitizing fluid, water, and/or gas from a cleaning operation.

Figure 3:
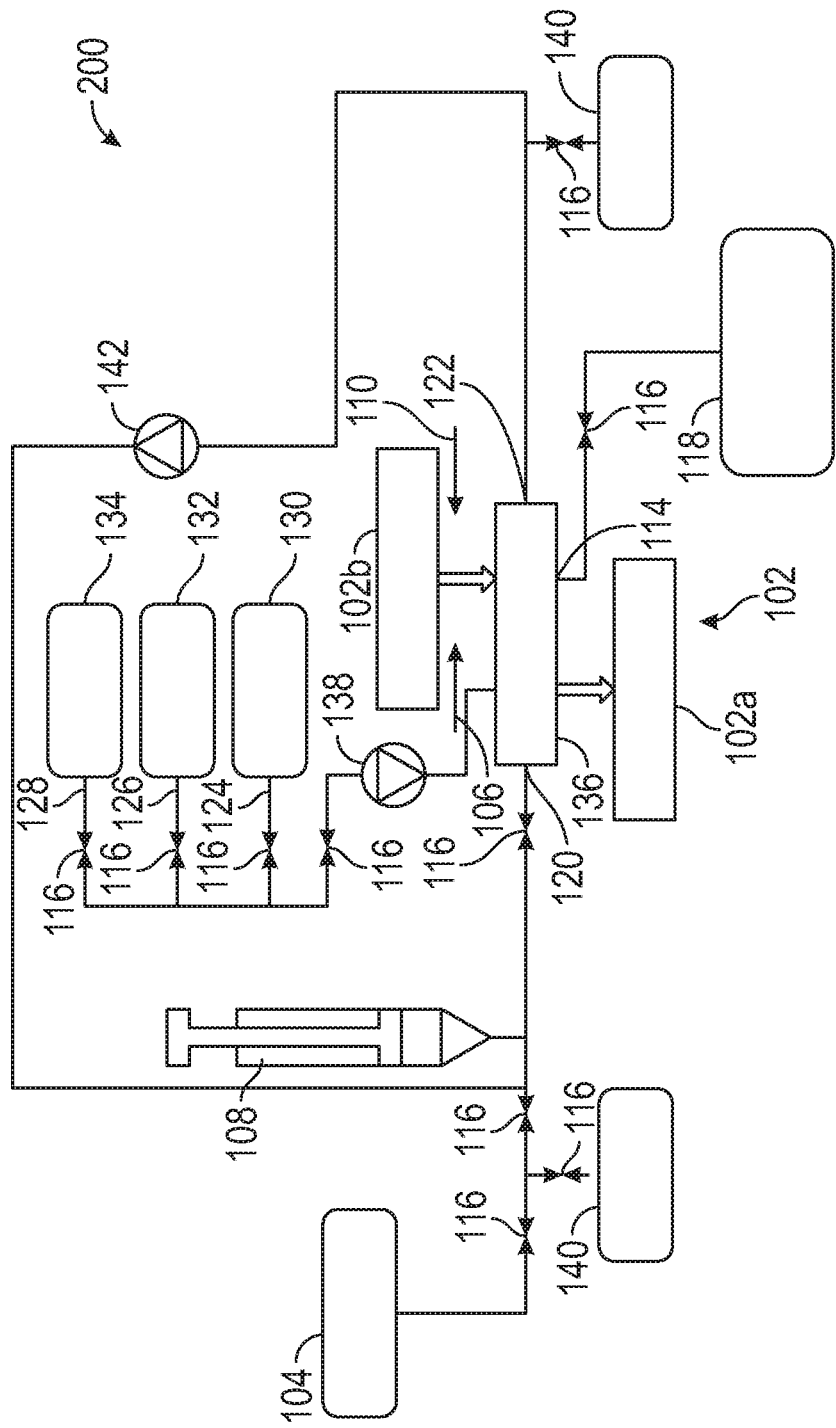
FIG. 3 illustrates another exemplary filtration system that can be used with an exemplary cell removal system.

FIG. 3 illustrates another embodiment of a cell removal system 200 in which a first filtration member (e.g., 102a) is used with a first sampling procedure and then replaced with a second filtration member (e.g., 102b) to provide a new filtration member for use with a second sampling procedure. As shown in the embodiment described and depicted with reference to FIG. 2, a cleaning shell 136 can be provided after the first filtration member is used and before the second filtration member is positioned in fluid communication with the sample flow path of the cell removal system 200. As described in more detail below, the same cleaning shell 136 can be used for each sanitizing operation. Alternatively, more than one cleaning shell can be provided and different cleaning shells can be used between two or more filtration procedures.

The cell removal system 200 of FIG. 3 operates similarly to the cell removal system 100 of FIG. 2. However, in FIG. 3, the sample flow path and filtration flow path can collectively form a closed loop system, which allows the sample to be introduced into the filtration system 102 in one or both directions 106, 110 by the operation of a first pump member 108 (e.g., a syringe pump) and/or an additional pump member 142 downstream of the first pump member 108. The additional pump member 142 can, in some embodiments, comprise a peristaltic pump.

Operation of the sanitizing process can likewise be similar to that described above with respect to FIG. 2, with the sanitizing fluid and other fluids (e.g., gas, water) being delivered through the sample flow path in part, or more preferably, in its entirety.

Figure 4:
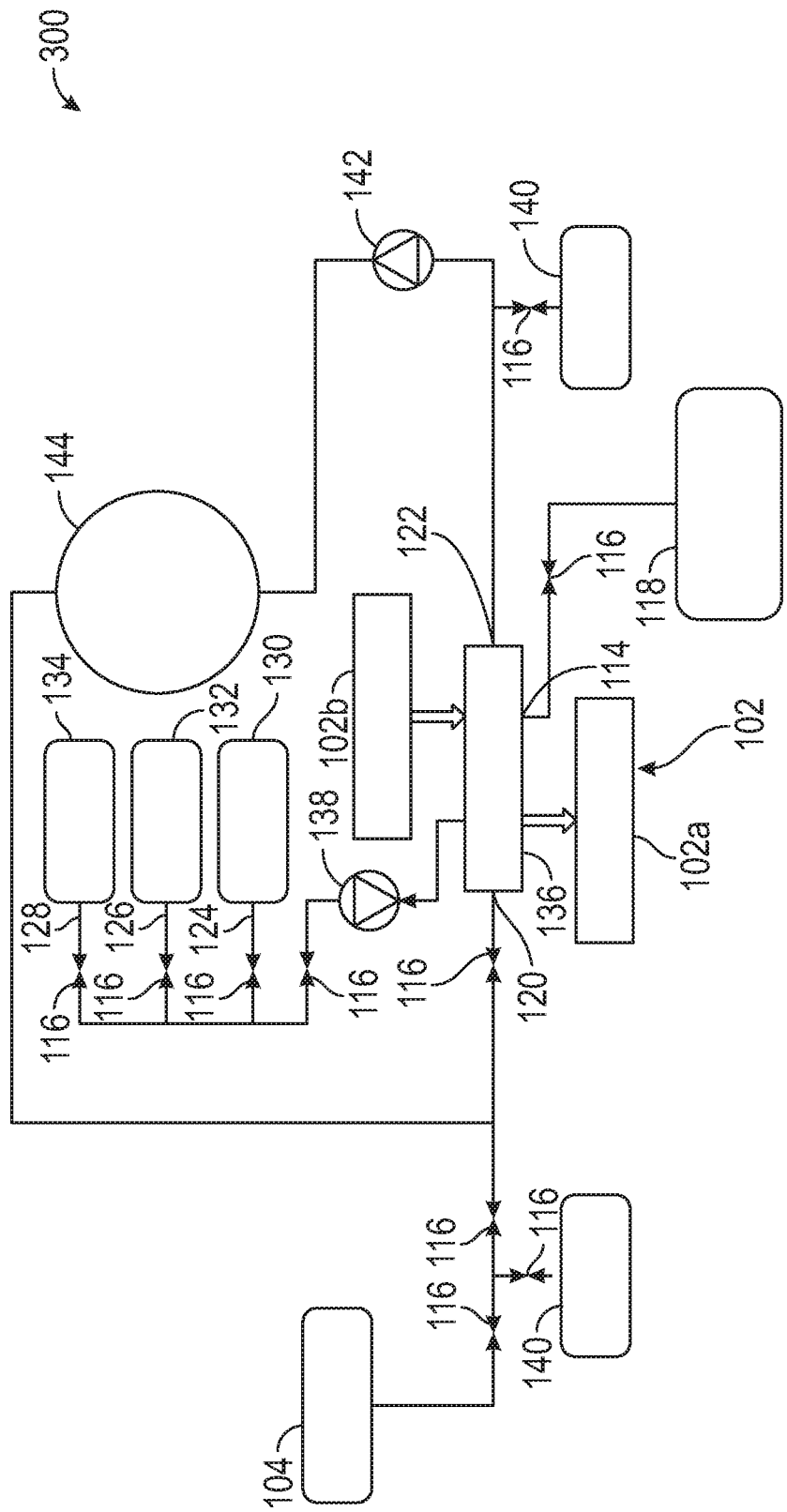
FIG. 4 illustrates another exemplary filtration system that can be used with an exemplary cell removal system.

FIG. 4 illustrates another embodiment of a cell removal system 300 in which a first filtration member (e.g., 102a) is used with a first sampling procedure and then replaced with a second filtration member (e.g., 102b) to provide a new filtration member for use with a second sampling procedure. Operation of the cell removal system 300 can be similar to that described with regard to FIG. 3 above. In addition, the cell removal system 300 further comprises a collapsible bladder 144 in the sample flow path.

Collapsible bladder 144 can be a variable volume reservoir that can receive a varying volume of fluid in the sample flow path (e.g., sample), thereby increasing the available volume of the fluid flow path to receive fluids. Thus, in a sampling procedure, a greater volume of sample can be received in the fluid flow path and, as permeate is removed, the collapsible bladder 144 can reduce in volume, thereby adjusting to accommodate an amount of remaining sample volume in the sample flow path.

Sanitization of the cell removal system 300 can be achieved as described in other embodiments, so that a portion of the sample flow path, or more preferably, the entirety of the sample flow path (including the collapsible bladder 144) can be sterilized for a subsequent sampling procedure.

Figure 5:
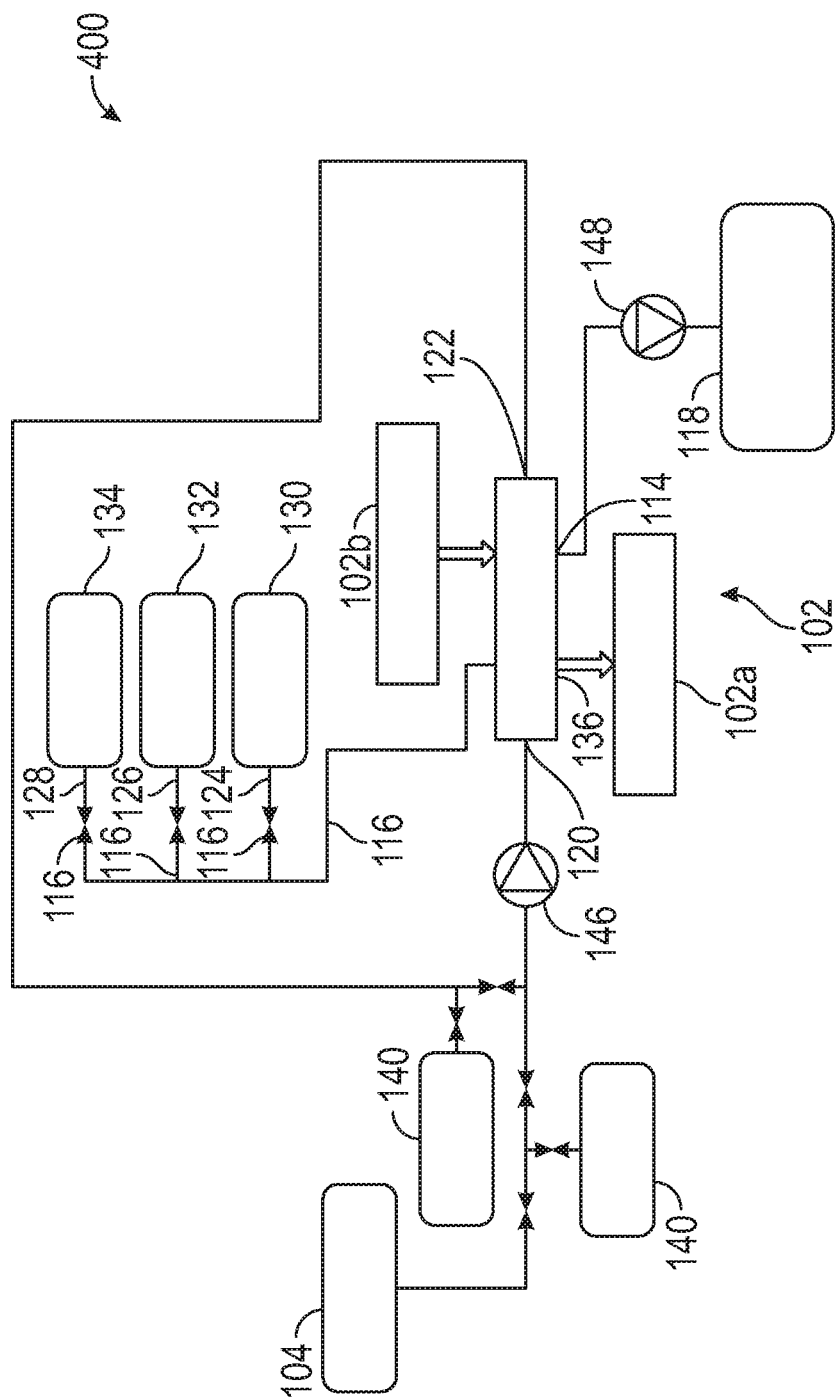
FIG. 5 illustrates another exemplary filtration system that can be used with an exemplary cell removal system.

FIG. 5 illustrates yet another embodiment of a cell removal system 400 in which a first filtration member (e.g., 102a) is used with a first sampling procedure and then replaced with a second filtration member (e.g., 102b) to provide a new filtration member for use with a second sampling procedure.

Cell removal system 400 comprises a first pump member 146 that is configured to deliver the sample and other fluids (e.g., sanitizing fluid, gas, water) through the sample flow path, the filtration flow path, and/or the connecting flow path as described herein. The first pump member 146 can comprise a peristaltic pump that causes the sample and other fluids to move through a closed loop sample flow path. In addition, another pump member 148 can be provided in fluid communication with the permeate that is separated from the cells to facilitate separation and delivery of the permeate to a downstream reservoir or liquid handling station 118.

Figure 6:
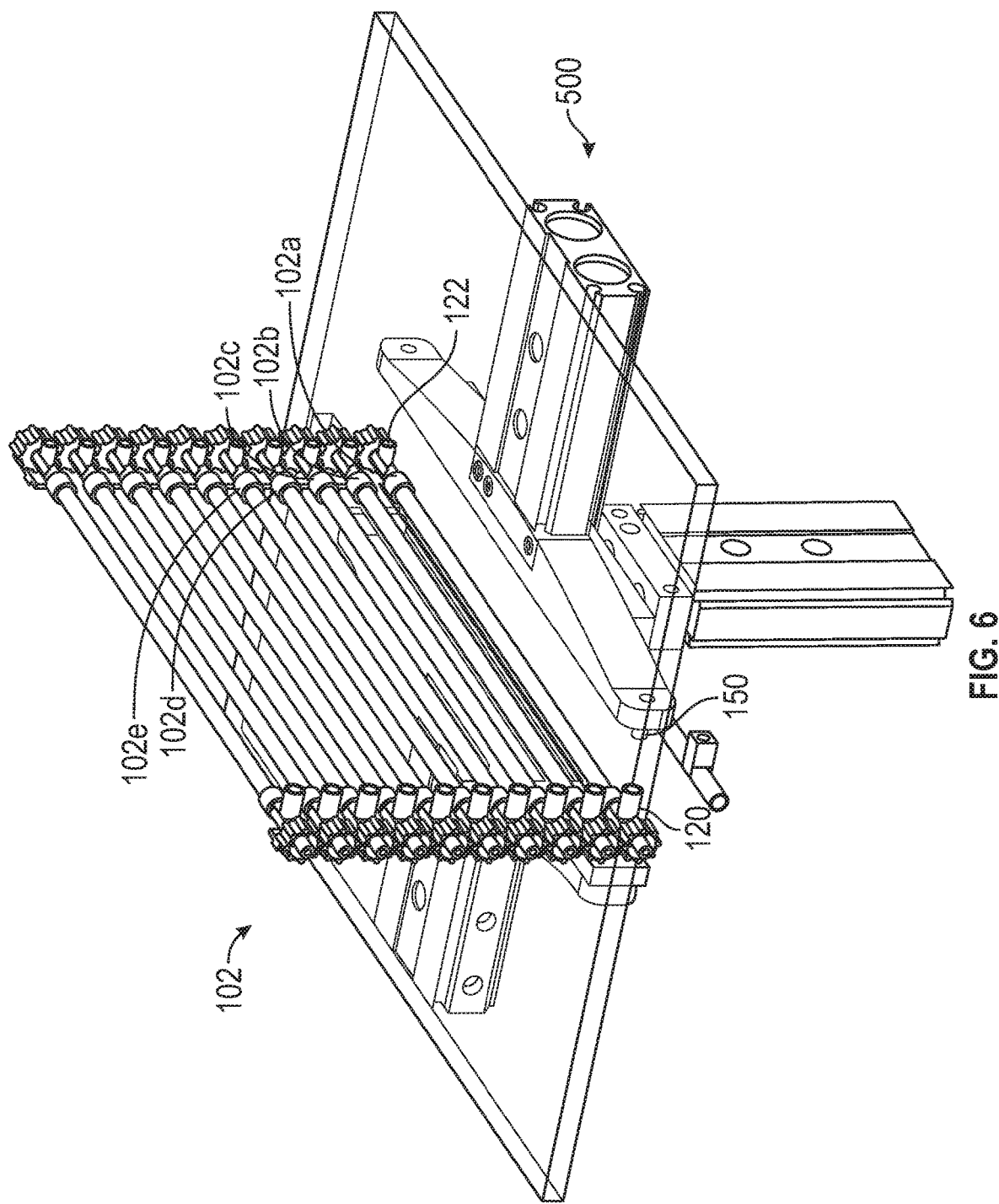
FIG. 6 illustrates an exemplary filtration replacement system.

FIGS. 6-10 illustrates an exemplary filtration replacement system 500 that is configured to receive a plurality of filtration members. For example, FIG. 6 illustrates a filtration system 102 that includes a magazine of multiple filtration members 102a, 102b, 102c, 102d, 102e, etc. These filtration members are arranged to drop into position for engagement with the sample flow path from above.

As shown in FIG. 6, each filtration member has a filtration system inlet 120 and a filtration system outlet 122. The inlet 120 and outlet 122 are configured to engage with a coupling device that places the filtration member in fluid communication with the sample flow path of the cell removal system (e.g., an inlet portion of the CRS adjacent the filtration system inlet and an outlet portion of the CRS adjacent the filtration system outlet).

Figure 7:
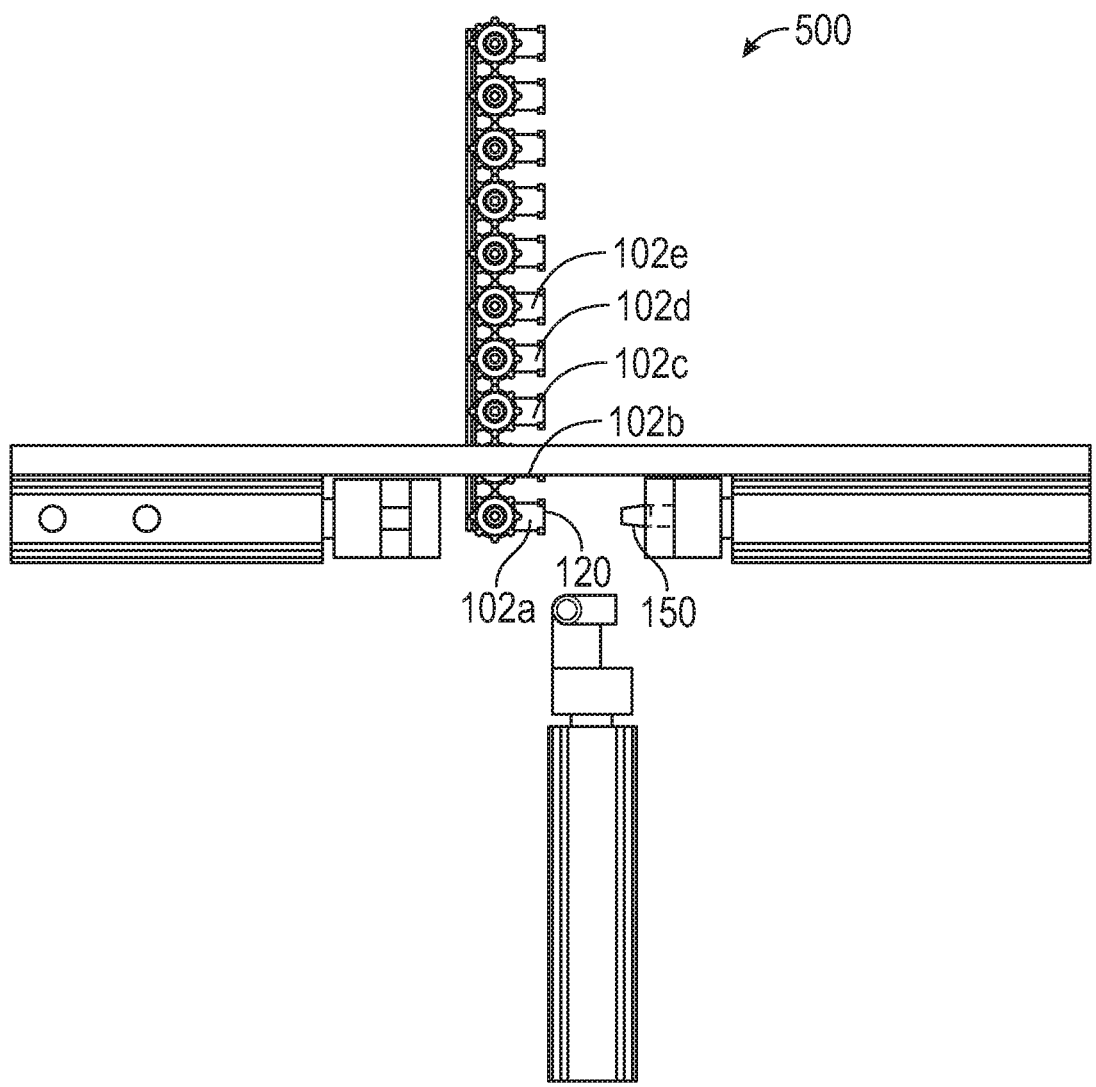
FIG. 7 illustrates the exemplary filtration replacement system of FIG. 6 in operation.
Figure 8:
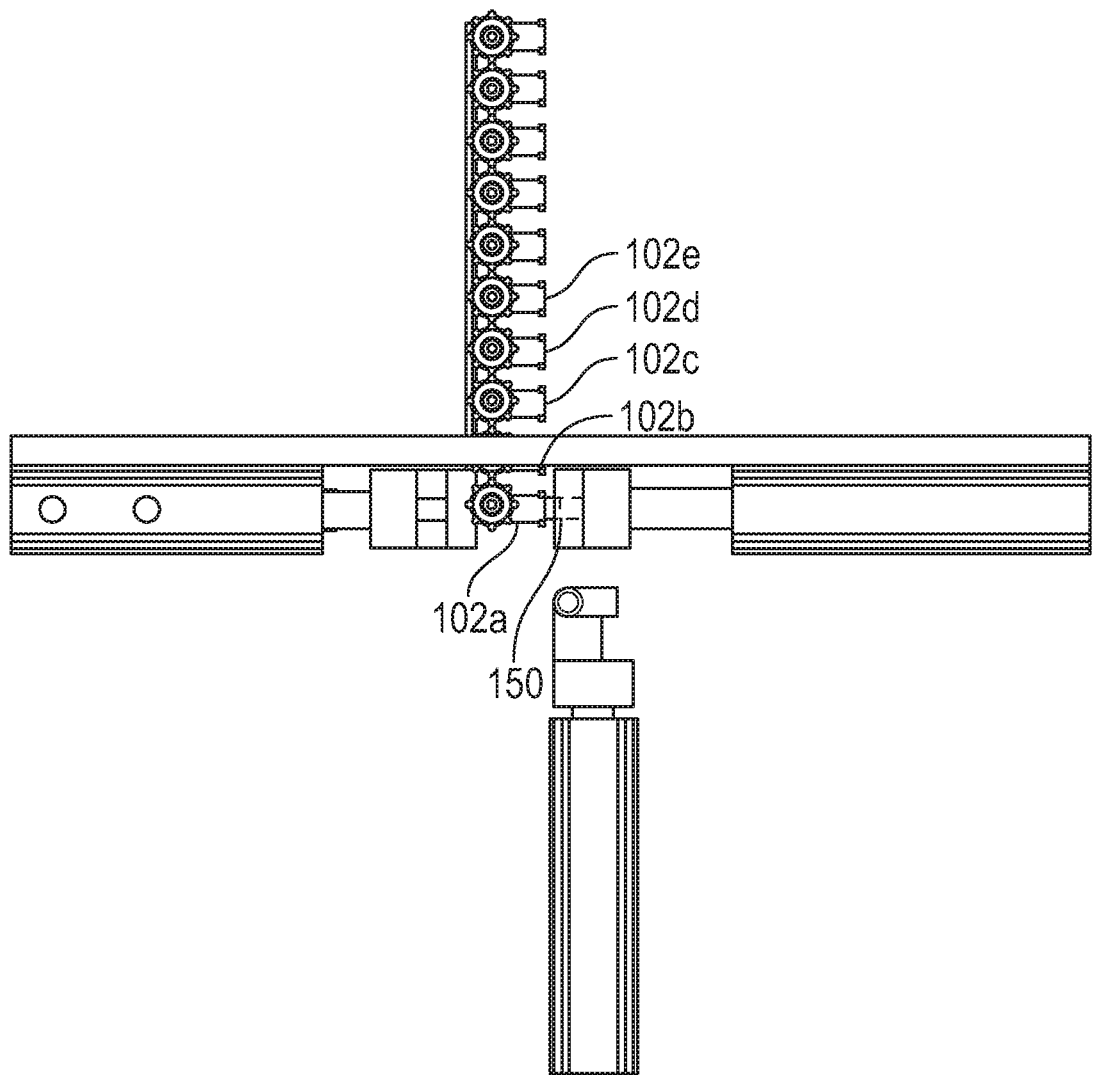
FIG. 8 illustrates the exemplary filtration replacement system of FIG. 6 in operation.

FIG. 7 illustrates a coupling device 150 on each side of the filtration replacement system 500 that engage with the filtration member to fluidly couple the coupling device 150 with filtration member 102a as shown in FIG. 8. Once engaged, a sample can be received in the sample flow path and delivered through the filtration member 102 as described in the embodiments above. For convenience, the coupling device for the filtration system sample outlet 114 (as shown in FIGS. 1-5) is not shown. However, coupling to the filtration system sample outlet 114 can be achieved in the same manner as shown with respect to the filtration system inlet 120 and filtration system outlet 122.

Figure 9:
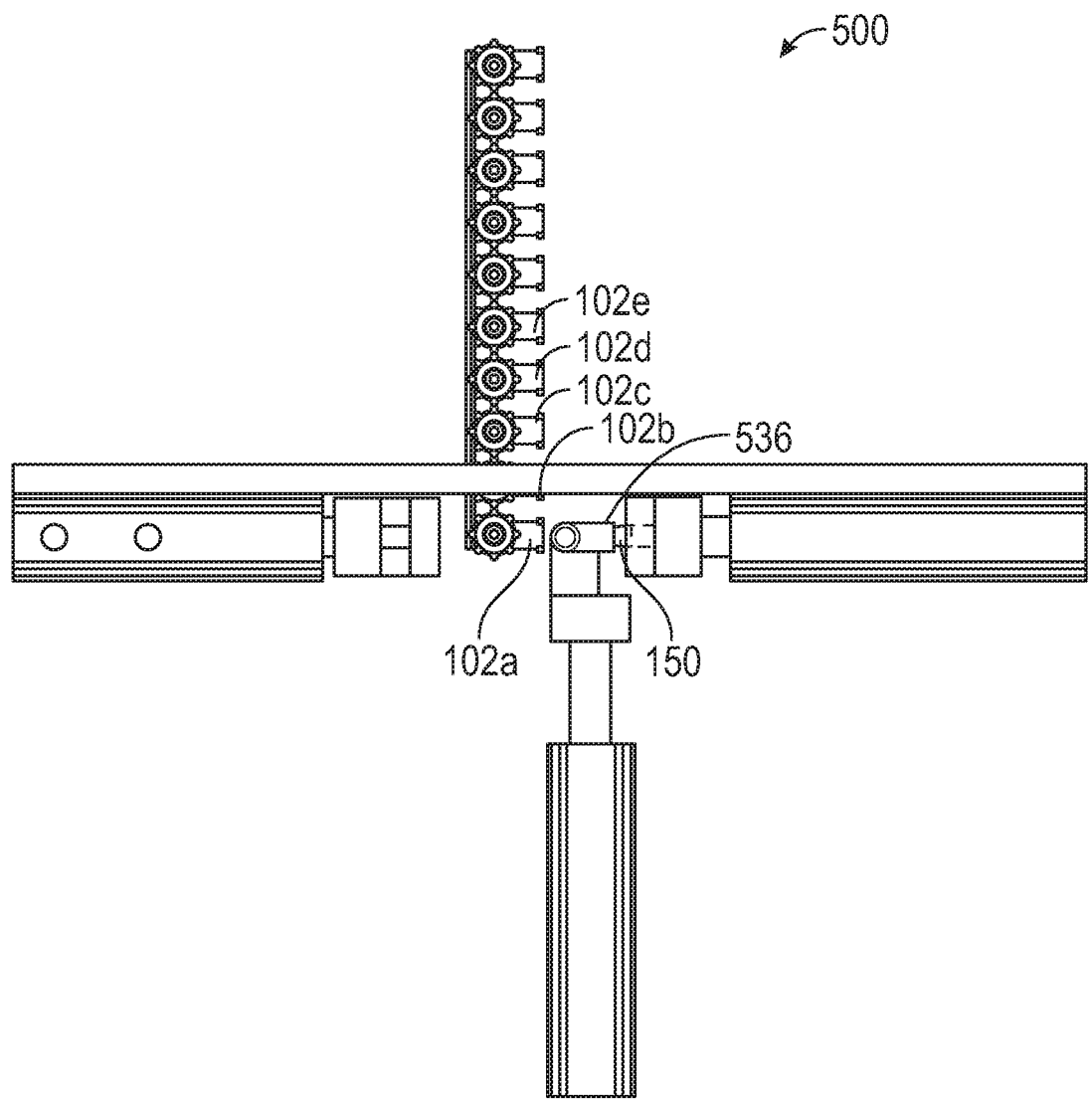
FIG. 9 illustrates the exemplary filtration replacement system of FIG. 6 in operation.

Referring to FIG. 9, after filtration is complete, the coupling device 150 can disengage with the formerly active filtration member (e.g., 102a) and engage with a cleaning shell 536. The cleaning shell 536 can be any shape or structure that permits the sanitization process to occur by allowing the transfer of sanitizing and cleaning fluids (e.g., sanitizing fluid, gas, water) from an upstream portion of the sample flow path to a downstream portion of the sample flow path to sanitize and clean the sample flow path between sampling procedures. As shown in FIG. 9, in some embodiments the coupling device 150 of the cell removal system can engage with the cleaning shell in the same manner as that of the filtration members.

Figure 10:
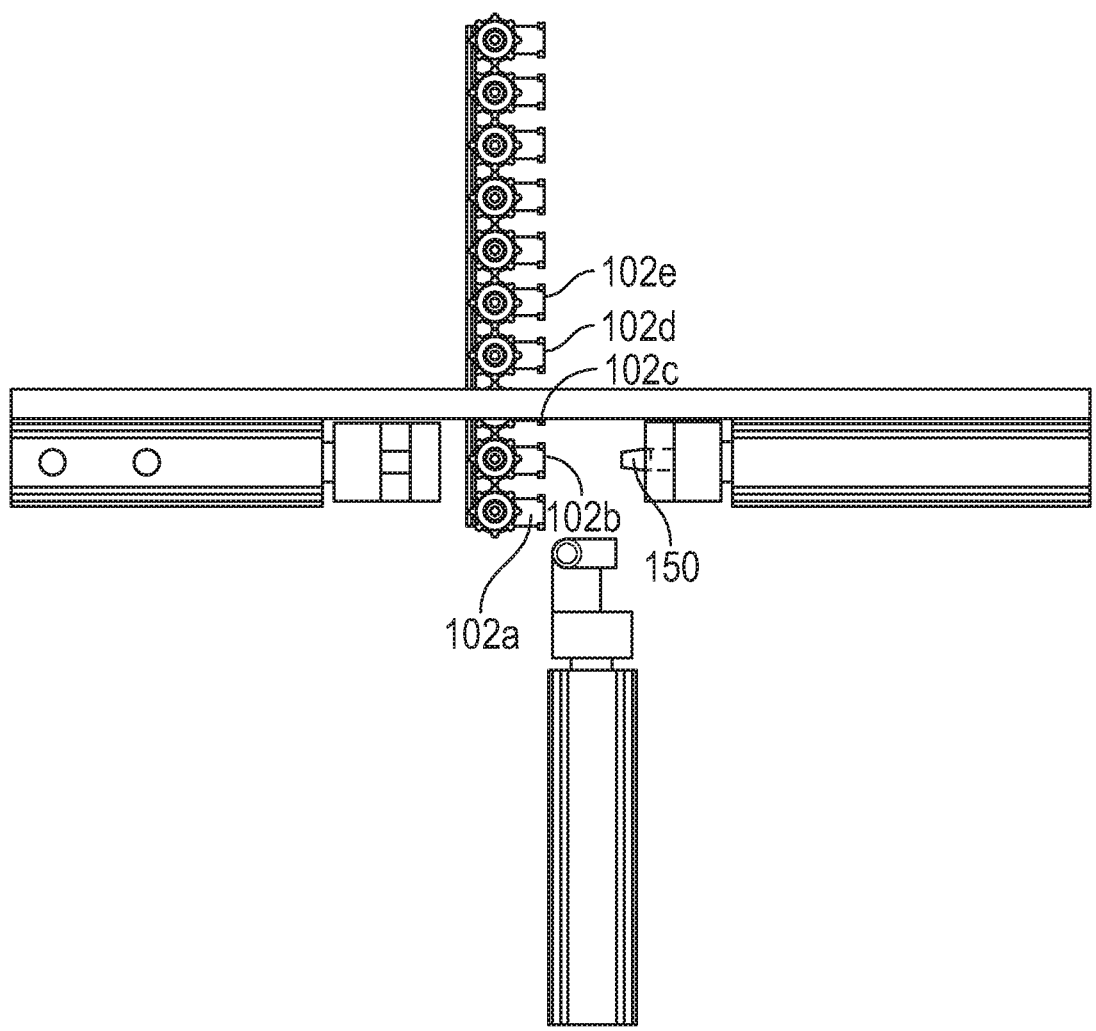
FIG. 10 illustrates the exemplary filtration replacement system of FIG. 6 in operation.

Referring to FIG. 10, after sanitization, the filtration replacement system 500 can index to the next filtration member (e.g., 102b) in the magazine to perform another sampling process with the next filtration member.

Figure 11:
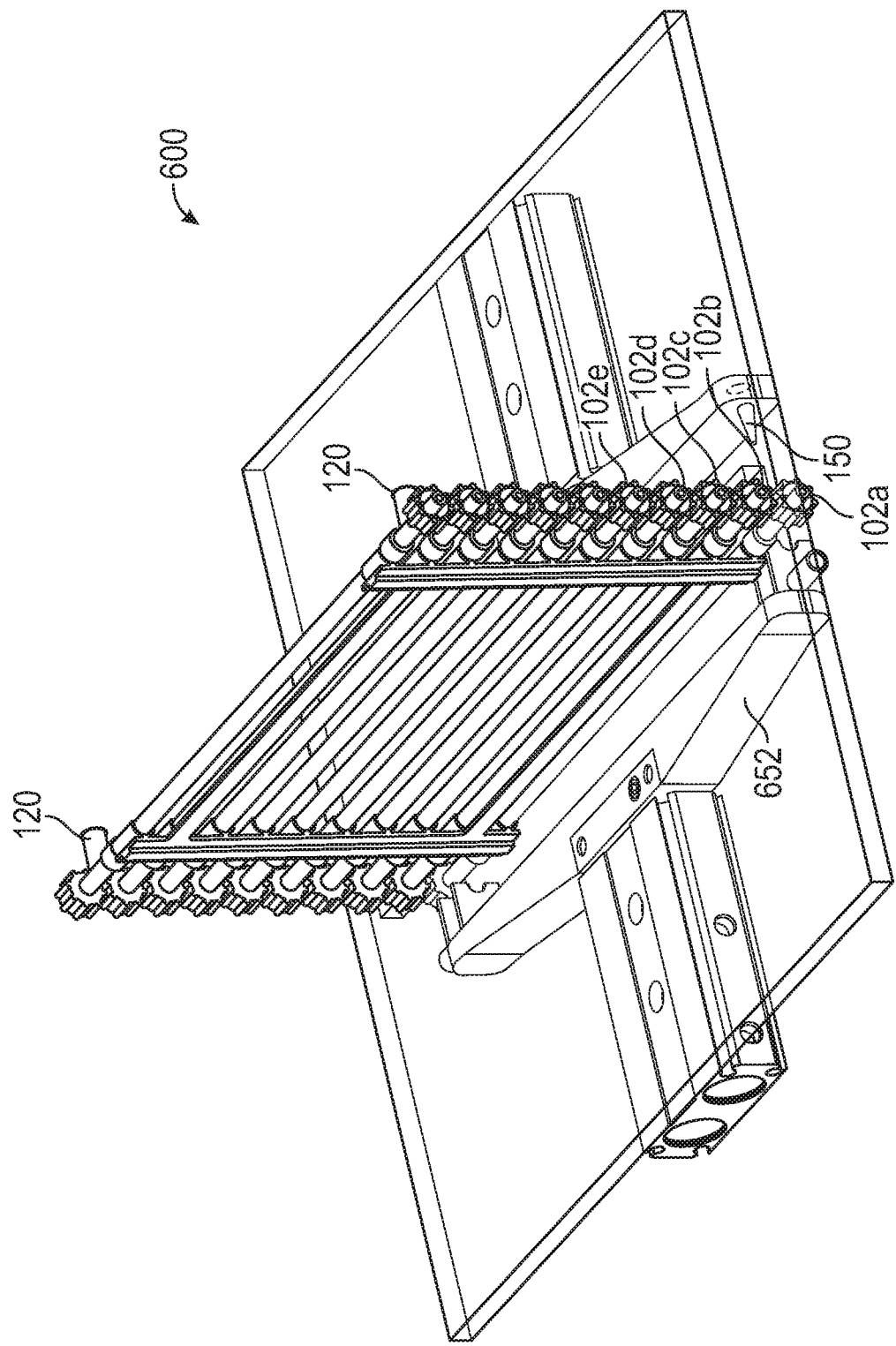
FIG. 11 illustrates another exemplary filtration replacement system.

FIGS. 11-15 illustrate another exemplary embodiment of a filtration replacement system 600. As shown in FIG. 11, the arrangement of system 600 is similar to that of system 500 (FIGS. 6-10. For example, FIG. 11 illustrates a filtration system 102 that includes a magazine of multiple filtration members 102a, 102b, 102c, 102d, 102e, etc., and these filtration members are arranged to drop into position for engagement with the sample flow path from above. As in the previous embodiment, each filtration member has a filtration system inlet 120 and a filtration system outlet 122 configured to engage with coupling devices 150 to place the respective filtration member in fluid communication with the sample flow path of the cell removal system.

Figure 12:
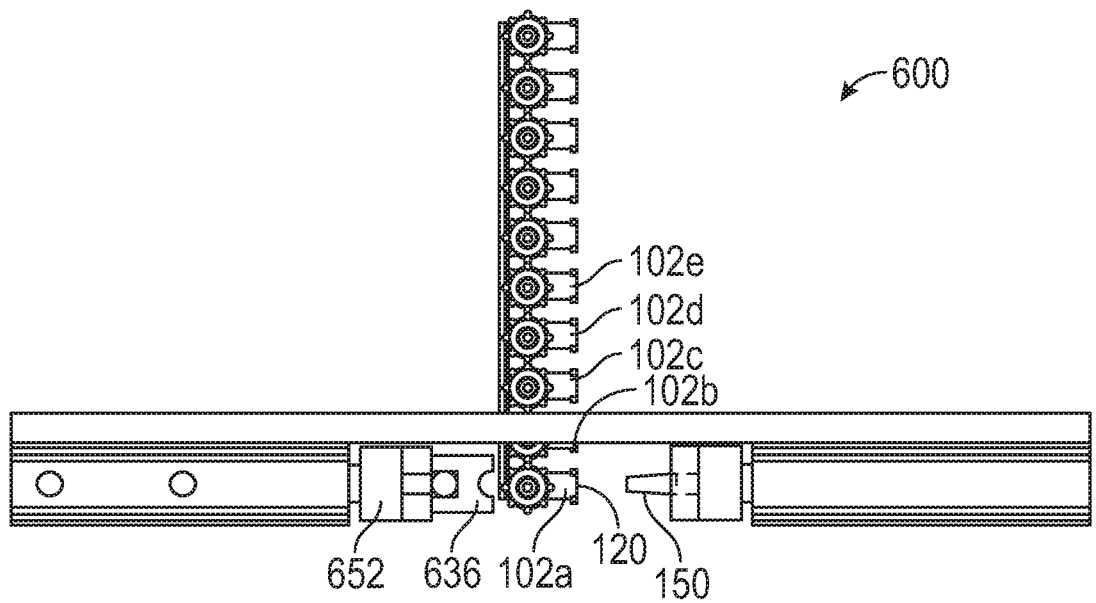
FIG. 12 illustrates the exemplary filtration replacement system of FIG. 11 in operation.
Figure 13:
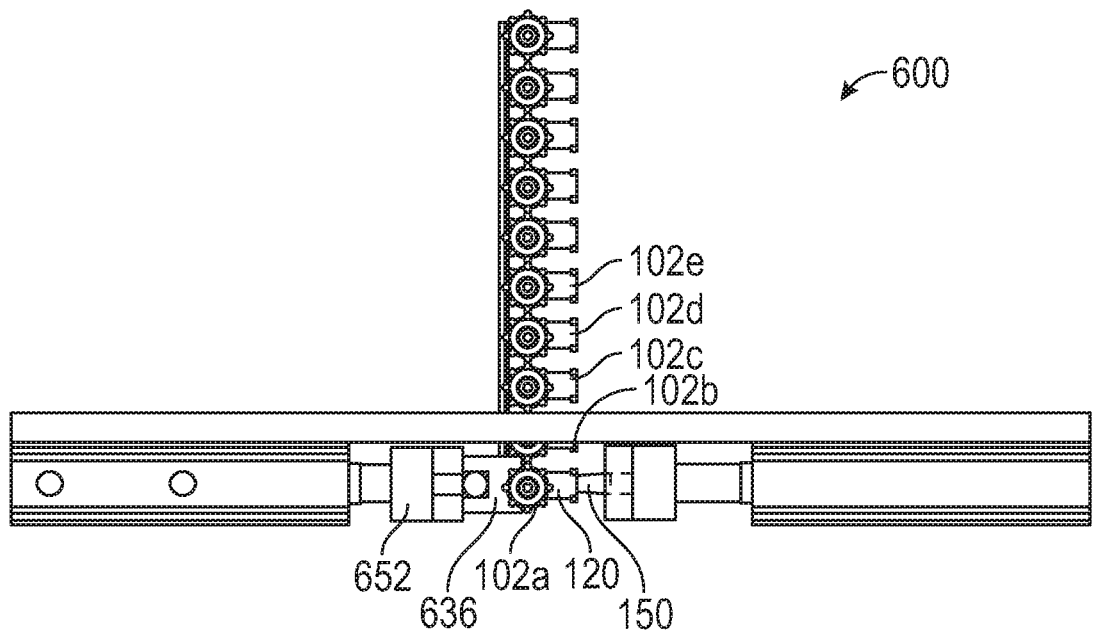
FIG. 13 illustrates the exemplary filtration replacement system of FIG. 11 in operation.

FIG. 12 shows a first filtration member 102a in position for engagement with the coupling device 150 and FIG. 13 shows the first filtration member 102a engaged with the coupling device 150 so that the first filtration member 102a is in fluid communication with the sample flow path of the cell removal system.

Figure 14:
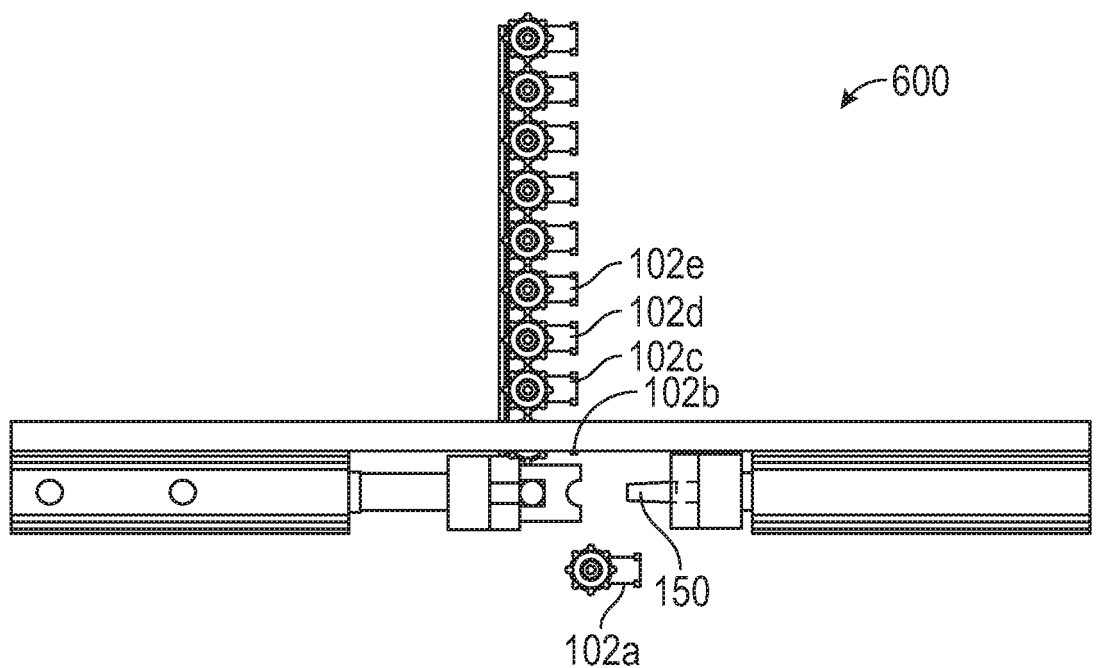
FIG. 14 illustrates the exemplary filtration replacement system of FIG. 11 in operation.
Figure 15:
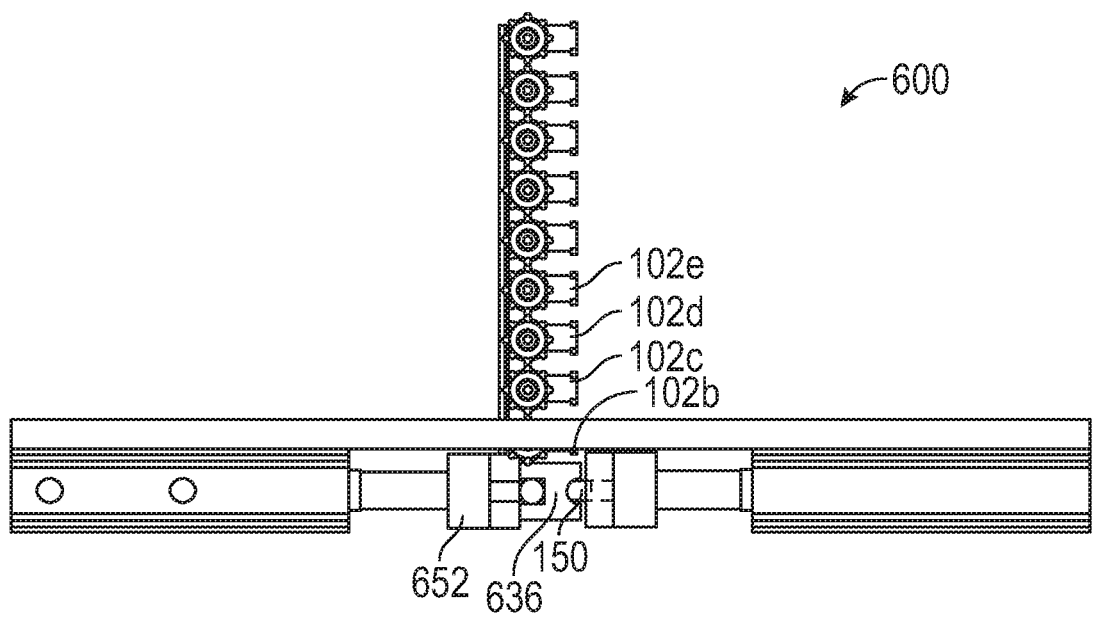
FIG. 15 illustrates the exemplary filtration replacement system of FIG. 11 in operation.

Referring to FIG. 14, after filtration is complete, the coupling device 150 disengages with the formerly active filtration member (e.g., 102a) and the filtration member is removed (e.g., discarded). Before engaging with a new filtration member, the coupling device 150 can engage with a cleaning shell 636. In this embodiment, the cleaning shell 636 comprises a lumen in a portion of one of the clamping structures 652 as shown in FIG. 15. As with the other cleaning shells disclosed herein, this structure permits the sanitization process to occur by allowing the transfer of sanitizing and cleaning fluids (e.g., sanitizing fluid, gas, water) from an upstream portion of the sample flow path to a downstream portion of the sample flow path to sanitize and clean the sample flow path between sampling procedures. After sanitization, the filtration replacement system 600 can index to the next filtration member (e.g., 102b) in the magazine to perform another sampling process with the next filtration member.

Figure 16:
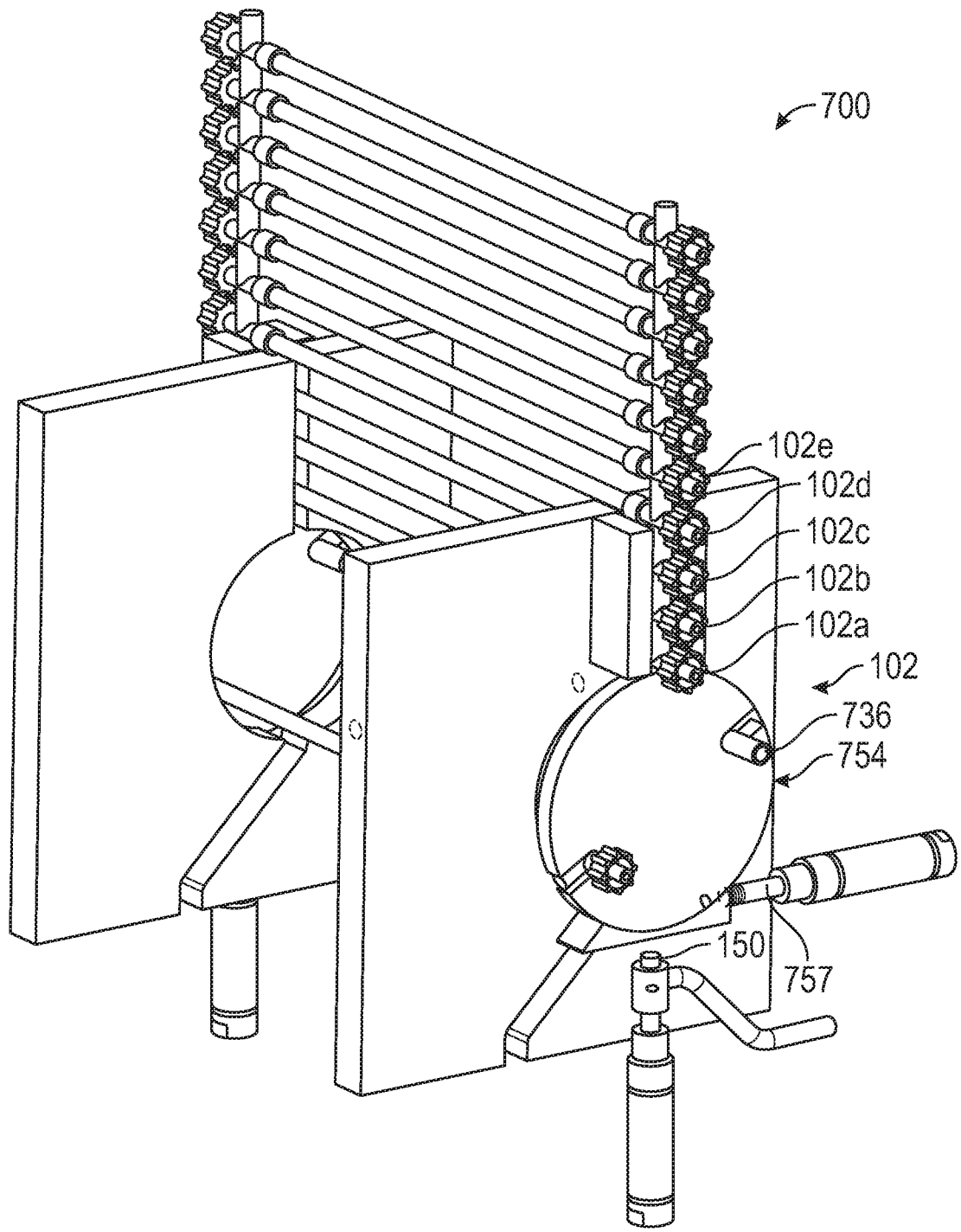
FIG. 16 illustrates another exemplary filtration replacement system.

FIGS. 16-21 illustrate another exemplary embodiment of a filtration replacement system 700. As shown in FIG. 16, the arrangement of system 700 uses a rotary delivery system for replacing filtration members after use. For example, FIG. 16 shows a filtration system 102 that includes a magazine of multiple filtration members 102a, 102b, 102c, 102d, 102e, etc., and these filtration members are arranged to rotate into position for engagement with the sample flow path. In addition, as in the previous embodiment, each filtration member has a filtration system inlet and a filtration system outlet that are configured to engage with coupling devices that place the filtration member in fluid communication with the sample flow path of the cell removal system.

Figure 17:
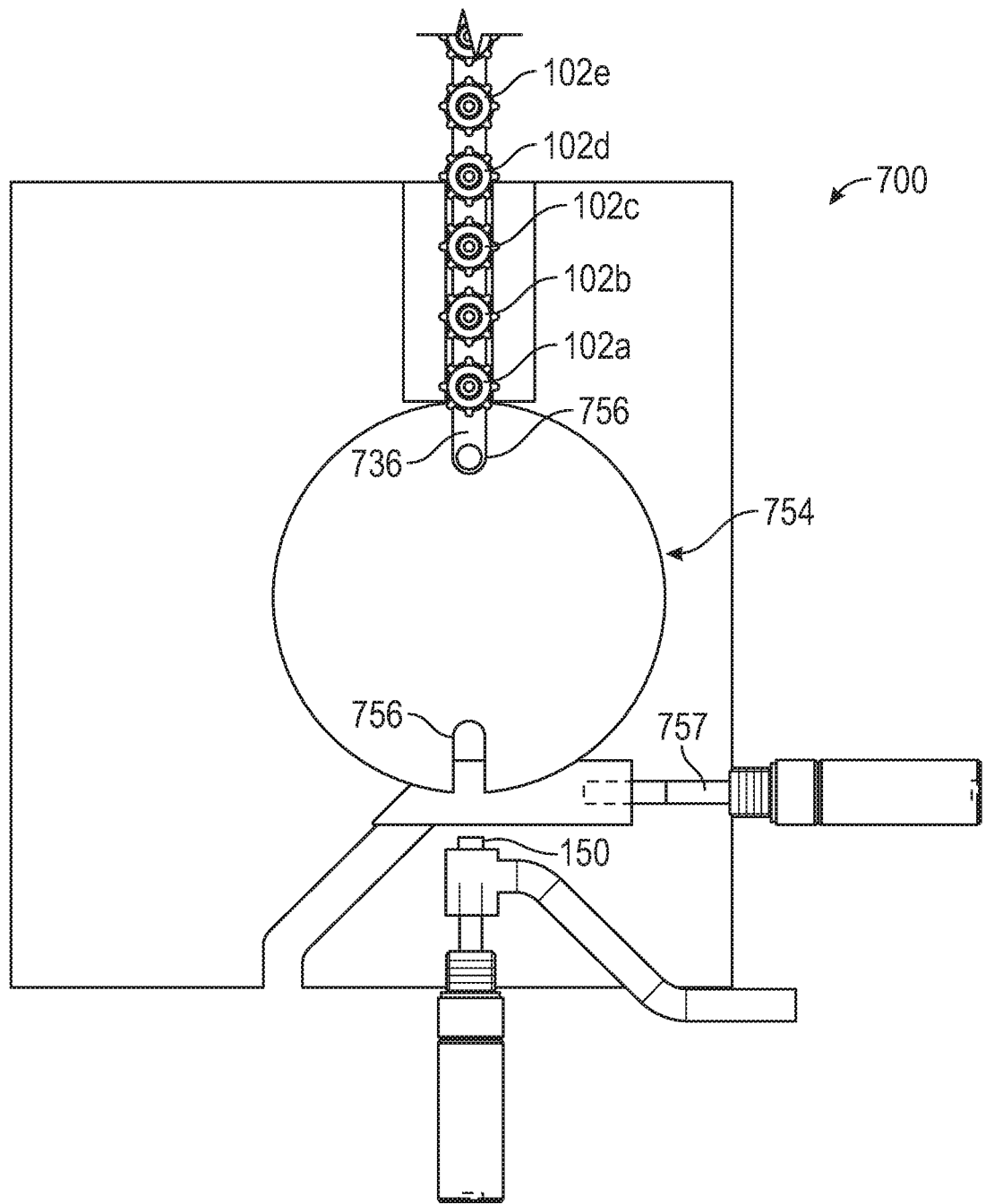
FIG. 17 illustrates the exemplary filtration replacement system of FIG. 16 in operation.
Figure 18:
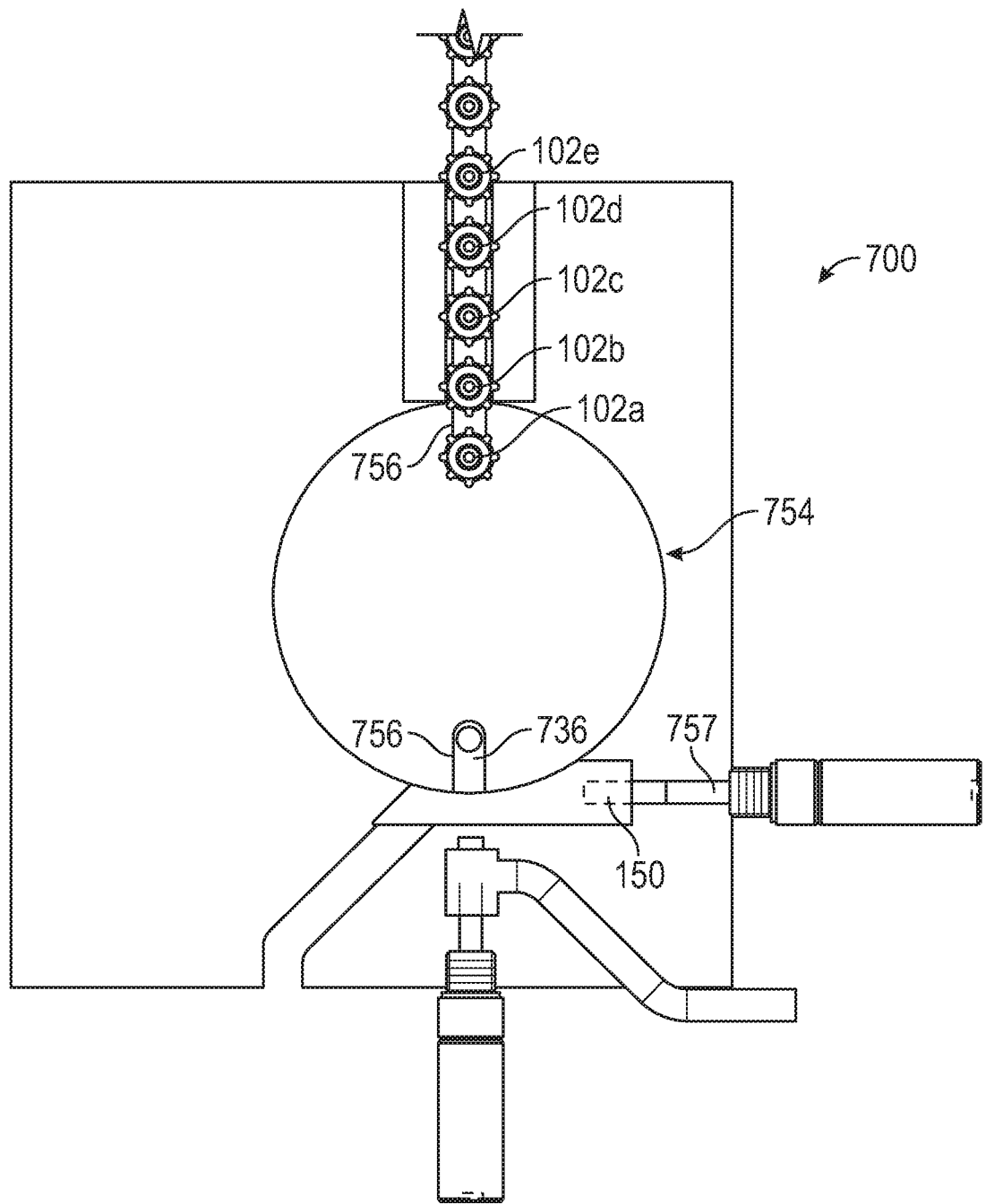
FIG. 18 illustrates the exemplary filtration replacement system of FIG. 16 in operation.
Figure 19:
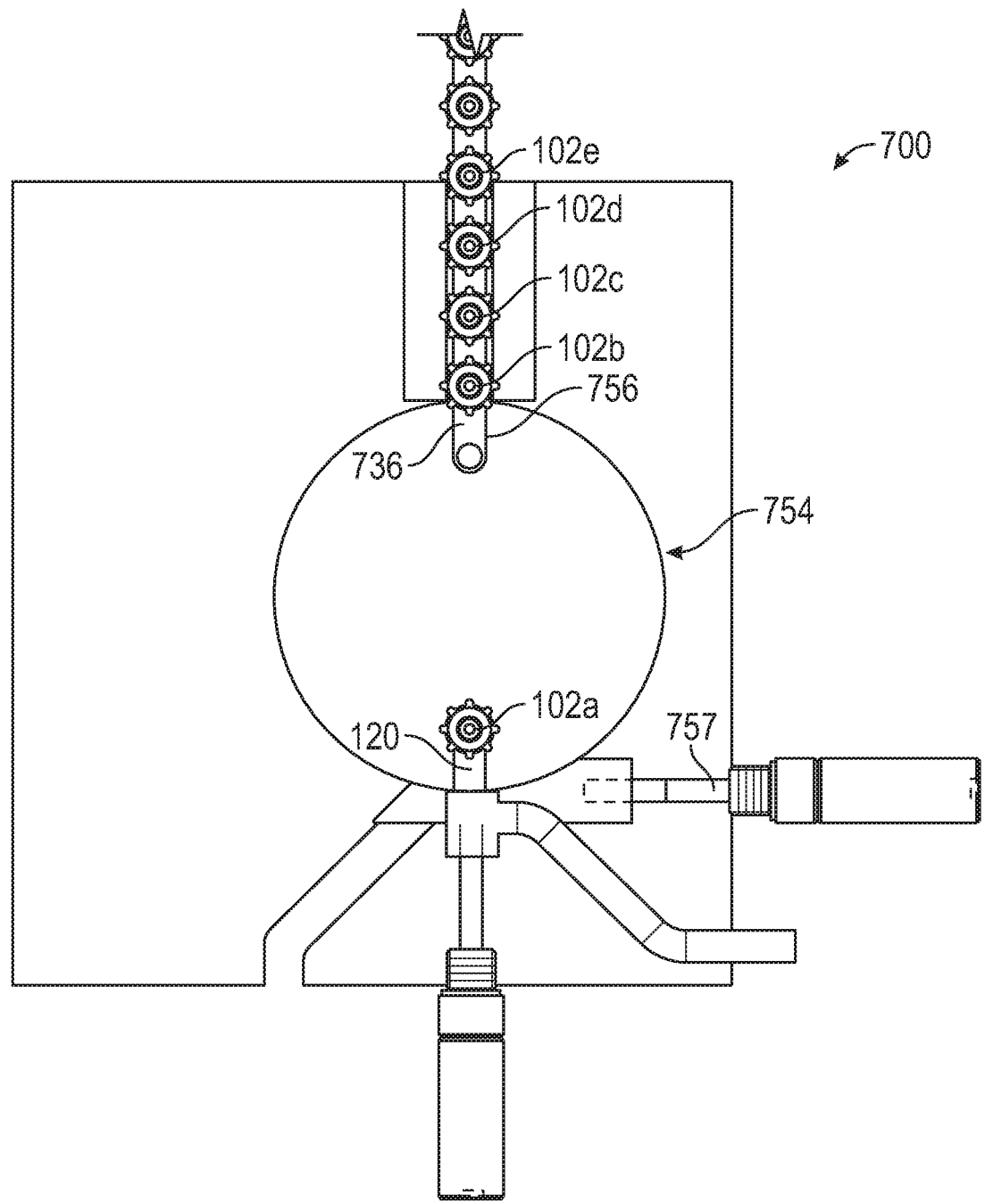
FIG. 19 illustrates the exemplary filtration replacement system of FIG. 16 in operation.

FIG. 17 shows a first filtration member 102a about to be received in the rotary loading device 754 and FIG. 18 shows it received in a slot 756 of the rotary loading device 754. FIG. 19 shows the first filtration member 102a after it has moved from the loaded position (i.e., at the top of rotary loading device 754 as shown in FIG. 18) to the operational position in which it is engaged with the coupling device 150. In this embodiment, the rotary device is indexed 180 degrees and the first filtration member 102a is dropped into position for engagement with the coupling device 150.

After the first filtration member 102a is engaged with the coupling device 150 as shown in FIG. 19, a sample can be drawn into the filtration member and filtration can begin. A second coupling device 757 can be provided to engage with the filtration system sample outlet 114 to receive the permeate after it has been separated from the cells.

Figure 20:
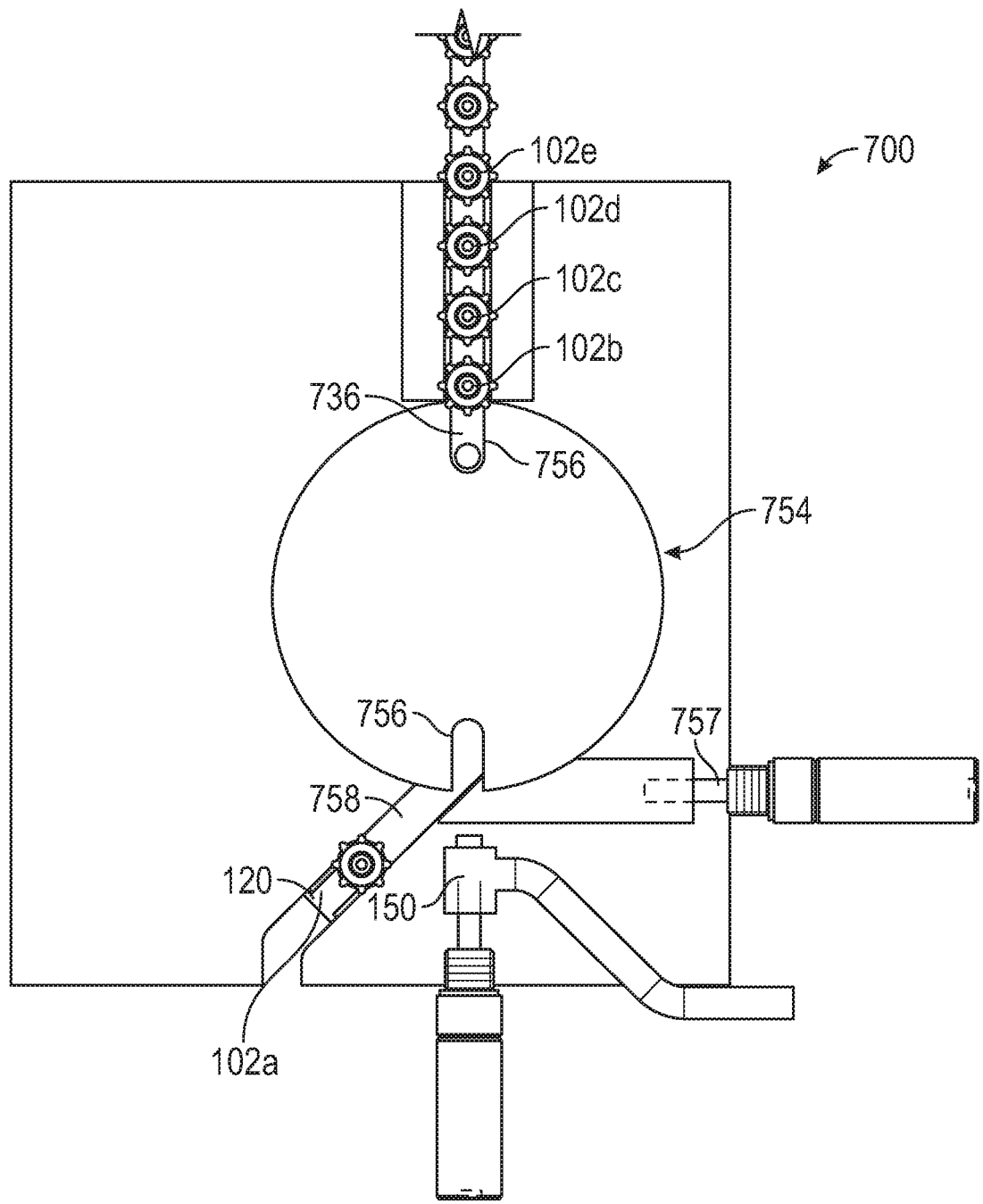
FIG. 20 illustrates the exemplary filtration replacement system of FIG. 16 in operation.

Referring to FIG. 20, after filtration is complete, the coupling device 150 disengages with the formerly active filtration member (e.g., 102a) and that filtration member is removed (e.g., discarded) through waste slot 758. Before engaging with a new filtration member, the coupling device 150 can engage with a cleaning shell 736 as shown in FIG. 21.

Figure 21:
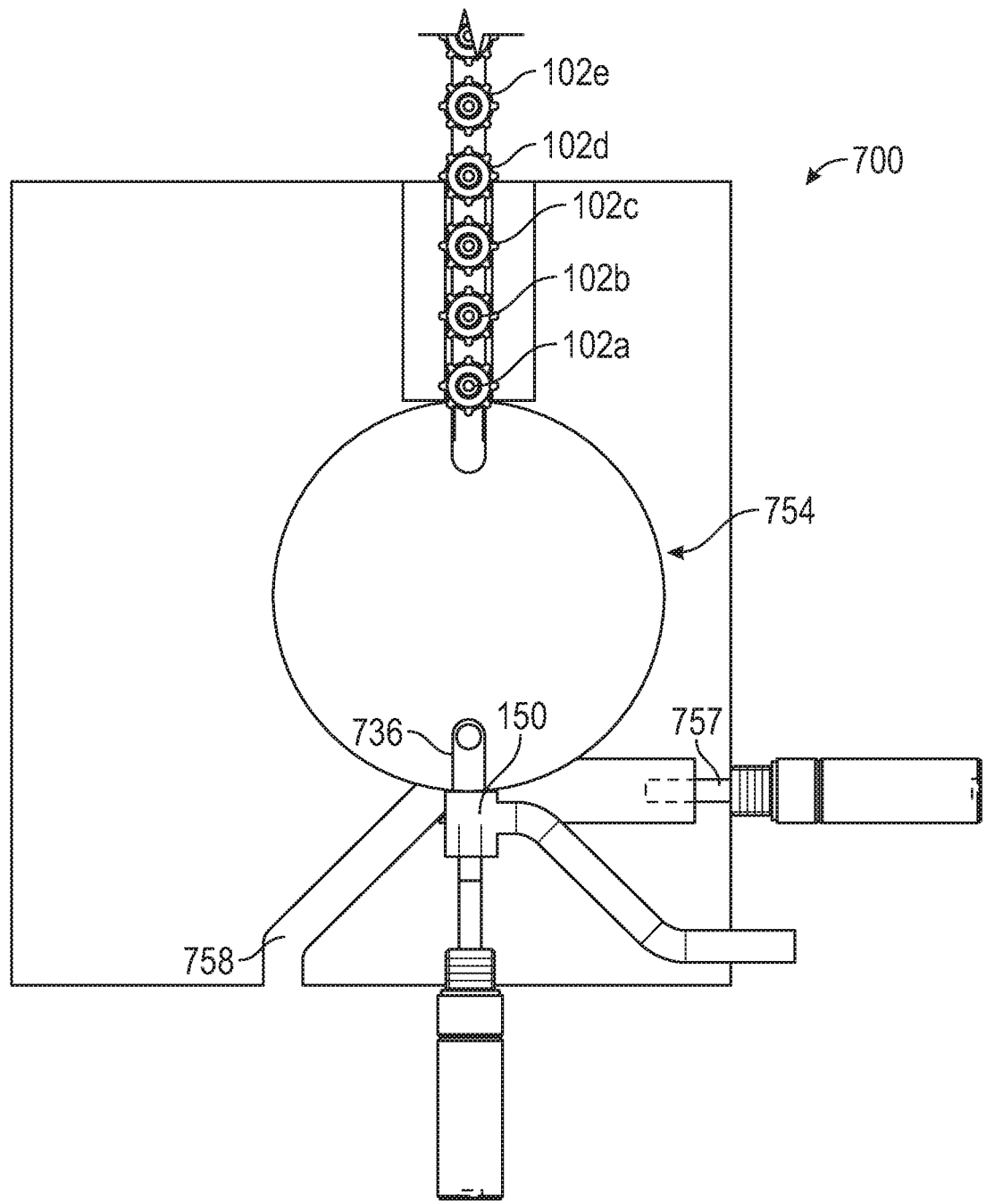
FIG. 21 illustrates the exemplary filtration replacement system of FIG. 16 in operation.

As shown in FIG. 21, the cleaning shell 736 can be fixed in a slot (or otherwise secured to the loading device) that is directly opposite the slot that receives the filtration members. Thus, as shown in FIG. 16, as a new filtration member is rotated into position for filtration, the cleaning shell 736 is rotated away from the sample flow path of the cell removal system, and, when a filtration member is discarded, the cleaning shell is rotated back into fluid connection with the sample flow path of the cell removal system, providing a connecting flow path that permits sanitizing and cleaning as disclosed herein.

The systems and methods described above provide many potential advantages over conventional CRS technologies that reuse sample contact parts including the filtration systems. In particular, the reuse of filtration systems can introduce a number of potential problems and disadvantages. For example, the cleaning process required for reuse of components increases turn-around time, as well as increases the potential for residual material from a previous sample remaining in the reused component which can result in sample contamination. In addition, the continued use of a filtration system (e.g., a hollow fiber member) for multiple sampling procedures can result in a decrease in separation efficiencies and requires additional procedures for monitoring the number of uses and the applications for which the filtration system has been used.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

What is claimed:

1. A filtration system for use with a cell removal system, comprising: a loading member, having a first slot and a second slot, the second slot for engaging with a cleaning shell, wherein the loading member is a rotary-indexed magazine, configured to receive a plurality of filtration members, wherein the plurality of filtration members are vertically arranged on the loading member, each of the plurality of filtration members including a filtration inlet, a filtration outlet, and a horizontal filtration flow path that extends from the filtration inlet to the filtration outlet; at least one actuator configured to move the plurality of filtration members, sequentially, from a non-active position in which a respective one of the plurality of filtration members is not in fluid communication with a sample flow path of the cell removal system, to an active position in which a respective filtration member is in fluid communication with the sample flow path, and to a discarded position in which the respective filtration member has been removed from fluid communication with the sample flow path, wherein the loading member, the first slot, and the second slot are arranged vertically along a long axis to sequentially move the plurality of filter members from an inactive position to an active position and to a discard position.

2. The filtration system of claim 1, wherein the rotary-indexed magazine is configured to receive a respective filtration member in the non-active position and rotate 180 degrees to move the respective filtration member into the active position.

3. The filtration system of claim 1, wherein the cleaning shell is configurable with a connecting flow path, wherein the at least one actuator is configured to move the cleaning shell into and out of fluid connection with the sample flow path of the cell removal system.

4. The filtration system of claim 3, wherein the cleaning shell is a linear member that extends from a first portion of the sample flow path to a second portion of the sample flow path.

5. The filtration system of claim 3, wherein the cleaning shell is a non-linear member that extends from a first portion of the sample flow path to a second portion of the sample flow path.

6. The filtration system of claim 1, wherein each of the plurality of filtration members further comprise a permeate outlet.

7. A cell removal system comprising: a sample flow path having a sample inlet for receiving a sample of a cell-containing solution; a vertically-oriented loading member configured to receive a plurality of horizontally-oriented filtration members, each of the plurality of filtration members including filtration inlet, a filtration outlet, and a filtration flow path that extends from the filtration inlet to the filtration outlet; at least one actuator configured to move the plurality of filtration members, sequentially, from a non-active position in a first slot in which a respective one of the plurality of filtration members is not in fluid communication with a sample flow path of the cell removal system, to an active position in a second slot opposite the first slot in which a respective filtration member is in fluid communication with the sample flow path, and to a discarded position in a waste slot in which the respective filtration member has been removed from fluid communication with the sample flow path, wherein the loading member, the first slot, and the second slot are arranged vertically along a long axis to sequentially move the plurality of filter members from an inactive position to an active position and to a discard position.

8. The cell removal system of claim 7, further comprising: a first fluid coupling device configured to engage and hold the filtration inlet and a second permeate coupling device configured to engage and hold the filtration outlet of a respective one of the plurality of filtration members.

9. The cell removal system of claim 7, further comprising: one or more pump systems configured to deliver the sample of the cell-containing solution through the sample flow path and the filtration flow paths of a respective one of the plurality of filtration members.

10. The cell removal system of claim 9, wherein the one or more pump systems comprise at least one syringe pump.

11. The cell removal system of claim 9, wherein the one or more pump systems comprise at least one peristaltic pump.

12. The cell removal system of claim 7, further comprising: one or more variable volume reservoirs in the sample flow path.

13. The cell removal system of claim 7, wherein the plurality of filtration members are vertically arranged on the loading member.

14. The cell removal system of claim 13, wherein the loading member is a rotary-indexed magazine.

15. The cell removal system of claim 14, wherein the rotary-indexed magazine is configured to receive a respective filtration member in the non-active position and rotate 180 degrees to move the respective filtration member into the active position.

16. The cell removal system of claim 7, further comprising a cleaning shell with a connecting flow path, wherein the at least one actuator is configured to move the cleaning shell into and out of fluid connection with the sample flow path of the cell removal system.

17. The cell removal system of claim 16, wherein the cleaning shell is a linear member that extends from a first portion of the sample flow path to a second portion of the sample flow path.

18. The cell removal system of claim 16, wherein the cleaning shell is a non-linear member that extends from a first portion of the sample flow path to a second portion of the sample flow path.

\* \* \* \* \*